United States Patent [19]
Dreschmann et al.

[11] Patent Number: 4,789,252
[45] Date of Patent: Dec. 6, 1988

[54] BEARING SYSTEM WITH WATER EXCLUSION

[75] Inventors: Peter Dreschmann, Dittlebrunn; Wilhelm Walter, Reith, both of Fed. Rep. of Germany

[73] Assignee: FAG Kugelfischer George Schafer (KGaA), Fed. Rep. of Germany

[21] Appl. No.: 82,046

[22] Filed: Aug. 5, 1987

[30] Foreign Application Priority Data

Jun. 3, 1987 [DE] Fed. Rep. of Germany ... 8707880[U]

[51] Int. Cl.$^4$ .......................... F16C 33/76; F16J 15/54
[52] U.S. Cl. ....................................... 384/486; 277/25; 277/133; 384/478
[58] Field of Search ........ 384/130, 135, 477, 478–482, 384/488, 484–486, 513, 544, 607, 627; 277/24, 25, 67, 68, 134, 133, 95, 152

[56] References Cited

U.S. PATENT DOCUMENTS

| | | | |
|---|---|---|---|
| 1,145,516 | 7/1915 | Schmid-Roost | 384/478 |
| 1,922,076 | 8/1933 | Brittain, Jr. | 277/133 |
| 2,227,922 | 1/1941 | Blackmore | 277/133 |
| 2,385,306 | 9/1945 | Shafer | 384/477 |
| 2,956,632 | 10/1960 | Forbush et al. | 384/544 X |
| 3,602,559 | 8/1971 | Hirschler | 384/478 |
| 4,647,230 | 3/1987 | Friedrich et al. | 384/486 X |

Primary Examiner—Stuart S. Levy
Assistant Examiner—Thomas R. Hannon
Attorney, Agent, or Firm—Ostrolenk, Faber, Gerb & Soffen

[57] ABSTRACT

A bearing has an outer ring that has an axially outward edge. The inner ring of the bearing has a flange that extends radially outward past the outer edge of the outer ring and defines a slot between them. The external surface of the outer ring is inclined radially inwardly moving axially inwardly from the outer edge of the outer ring for defining a conical section terminating in a circumferential groove. Internally, the outer ring has a borehole in from the outer edge which is also radially inwardly inclined moving axially inward from the outer edge. The outward surface incline directs water away from the slot. The inward surface incline directs water between the rings outward through the slot. The single inclined surface on the exterior of the outer ring may be replaced with a series of inclined surfaces giving the exterior a toothed appearance. A seal may be disposed internally between the outer and inner rings. Attachment boreholes in the flange are at the radially outward tip of the axially edge of the outer ring.

19 Claims, 2 Drawing Sheets

BEARING SYSTEM WITH WATER EXCLUSION

BACKGROUND OF THE INVENTION

The present invention refers to a bearing system with a seal and means for excluding water from inside the bearing for use, for instance, for a wheel bearing for an automotive vehicle.

A bearing system with seal of the abovedescribed type is shown in European Patent Application Publication No. 65 127. In the seal shown there, the obliquely outward directed sealing lip causes any water mixed with dirt that has possibly entered through the slot and collected in the space in front of the sealing lip, to be discharged in the direction of gravity and brought, to the greater part, out again through the slot. But outside the slot, the water undesirably collects on the external or peripheral surface of the possibly stationary outer ring. The water can then penetrate through the slot again, at least in the upper region or top side of the outer ring, and thereby affect the inner seal so that dirty water passes inside the bearing.

SUMMARY OF THE INVENTION

It is therefore the object of the present invention to improve the seal so that accumulation of dirty water in the region of the slot on the outer ring is avoided.

A further object is to reduce the chance that dirty water will penetrate past the outer ring and into the space between the inner and outer rings.

Yet another object is to aid the outlet of dirty water from between the outer and inner rings once it penetrates into that region.

According to the invention, a bearing has an outer ring, an inner ring radially inward of the outer ring and a plurality of rolling elements such as balls, which travel in respective raceways between the outer and inner rings. The outer ring has an axially outward edge and also has an external peripheral surface around it. The inner ring supports a flange which is integral with the inner ring or is attached to it and which extends from the inner ring radially outward, and axially outward past the axially outer edge of the outer ring. The flange and outer ring are so shaped and placed that the bypassing flange defines a small axial length slot between the flange and the edge of the outer ring. Through that slot, water can undesirably enter the space between the inner and outer rings. The invention seeks to avoid that. Through that slot, any water that does enter that space could be caused to exit, also according to the invention.

The external surface of the outer ring, toward the axial edge past which the flange extends, is inclined radially inwardly, moving axially away from the axial outer edge and thereby defines a conically shaped section of the external surface of the outer ring. Any liquid or water which contacts the external surface of the outer ring in the vicinity of the slot would tend to move axially away from the axial outer edge of the slot along the conical surface. The conical surface terminates in a circumferential groove axially inward from the axial outer edge of the outer ring.

The outer ring has an internal borehole with an interior surface. Axially inward from the axial outer edge of the outer ring, that borehole is inclined radially inwardly, defining a conically tapering shape for the borehole. That inclined surface in the borehole is inclined generally parallel to the inclined surface on the exterior of the outer ring. The conically inclined internal borehole provides an inclined pathway for any water that has gathered inside the space between the inner and outer rings to run off the inclined borehole and through the slot.

A sealing element may be disposed in the space between the inner and outer rings, supported on the outer ring and engaging the inner ring and possibly also engaging the interior of the flange for providing further protection to the rolling elements which are axially inward past the seal.

In an alternate embodiment, the external surface of the outer ring has a plurality of successive inclined sections, each more axially inward than the preceding and each defining a respective inclined section and a respective conical shape, giving the external surface in the region near the axially outward edge of the outer ring a toothed cross section. Each of those inclined sections tends to trap water and direct it away from the slot, and each defines a fine edge off which the water might be flung when the outer ring is rotating.

Because the external surface of the outer ring has an inwardly inclined conical section in the lateral region adjacent the slot, the dirty water in the upper region of the outer ring flows away from the slot, when the outer ring is stationary and under the force of gravity, it flows around the lateral surface of the outer ring and drips down under the force of gravity. Even if movement of water toward the slot should take place in the lower region, due to the oblique conical surface, no dirty water will penetrate here into the slot since with the inner ring rotating, the water is flung away and, even upon standstill, penetration of water contrary to the force of gravity does not take place. Placing the inclined section directly on the somewhat lengthened outer ring is favorable from the standpoint of manufacture and assembly, without having to increase the number of parts.

This extremely simple measure highly efficiently keeps the dirty water from the inner lip seal and away from the inside of the bearing. Tests have shown that in this way, the life of the bearing may be substantially increased.

In order to be able to discharge the dirty water more controllably, a circumferential groove is provided alongside of the inclined conical section in another embodiment. This limits the concentration of water, by simple means, to merely a small portion of the lateral surface.

In order to assure removal of water even if dirty water nevertheless penetrates into the inner space between the slot and the sealing lips, the borehole section inside the outer ring is arranged parallel to the inclined lateral surface, in a further embodiment. On the lower part of the bearing, this produces a conical surface on which the collecting water is conveyed under the force of gravity toward the slot, and it is transported towards the outside there.

Because the tip produced between the inclined section and the slot is located in the region of the attachment borehole, the bead of spray water is interrupted when the inner ring is rotating and the water is better thrown away from the slot.

The object of the invention is also achieved by an embodiment in which several inclined sections are provided in the region of the slot on the external surface of the outer ring. These produce a sawtooth-like section, as seen in partial cross section. With the outer ring stationary, the dirty water collects in the upper region in the troughs of the teeth, travels downward, and then drips in the lower region off the tips of the teeth under the force of gravity. With the outer ring rotating, the dirty water will immediately pass to the tips of the teeth and will be flung from there in all radial directions. In both cases, the dirty water is excellently kept away from the slot.

Other objects and features of the invention are explained in further detail with reference to the drawings.

DESCRIPTION OF THE PREFERRED EMBODIMENTS

Figure 1:
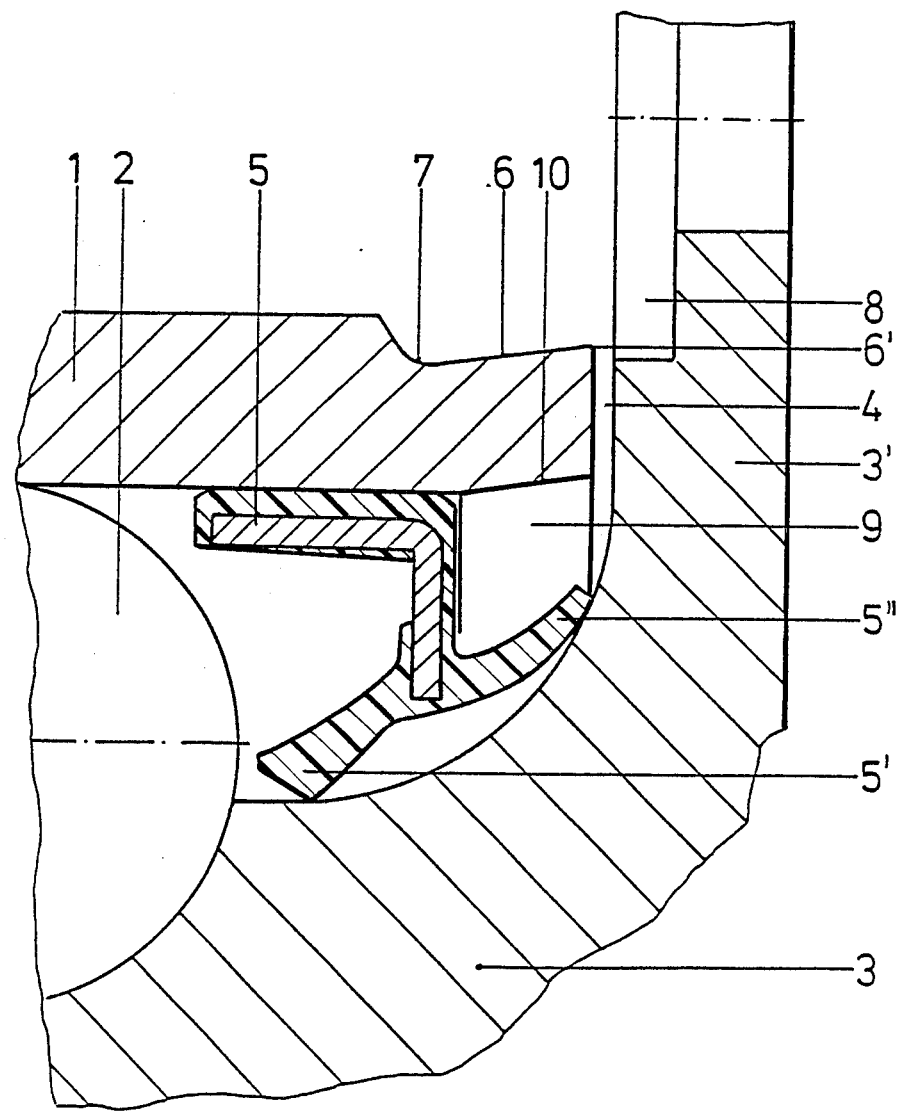
FIG. 1 shows a partial cross section through a first embodiment of a wheel bearing system with seal for an automotive vehicle according to the invention.

Referring to FIG. 1, the anti-friction bearing to be sealed off comprises the outer ring 1, the balls 2 and the inner ring 3. The ring 3 integrally merges into a radially outwardly directed flange 3 that projects past the axially outward edge of the outer ring 1. The outer ring 1 is of such axial width that it is spaced from the flange 3' by a small axial slot 4. Since the seal defined at and by the slot 4 is not sufficient, an inner flexible material seal 5 is also provided, which in this case is fastened to the outer ring 1 and rests slidingly via two sealing lips 5' and 5" against the inner ring 3 and the radial flange 3' respectively.

In order to keep dirty water as much as possible from the slot 4, the outer ring 1 is specially shaped in the region of the slot 4. This comprises a slightly axially and radially inwardly inclined, conically shaped lateral portion 6 of the external or peripheral surface of the outer ring, which terminates axially inwardly in a circumferential groove 7. When the outer ring 1 is stationary, the dirty water in the top or upper region of the outer ring will flow inward from the edge 6' over the inclined conical surface 6 to the groove 7. This reduces the danger of dirty water in this region penetrating into the slot 4. In the lower, but less critical region of the outer ring, the water, to be sure, is directed to move toward the tip 6'. Instead, it drips from there under the force of gravity and is therefore kept away from the slot 4.

It is beneficial if the tip 6' terminates in the region of the attachment boreholes 8 of the flange 3'. That interrupts the bead of water and flinging off of the water is favored.

To improve the removal of dirty water, which at times nevertheless penetrates into the space 9 between the rings, an oblique conical surface 10 is also provided in the region of the bore of the outer ring. The surface 10 is inside the surface 6 and is generally parallel to it. This favors the outward flowing out of the dirty water in the lower region of the outer ring, since it flows on the oblique or conical surface 10 toward the slot 4 and is thus conveyed outward, supported by the rotating flange 3'. This occurs when the outer ring is stationary but also occurs when the outer ring 1 rotates.

Figure 2:
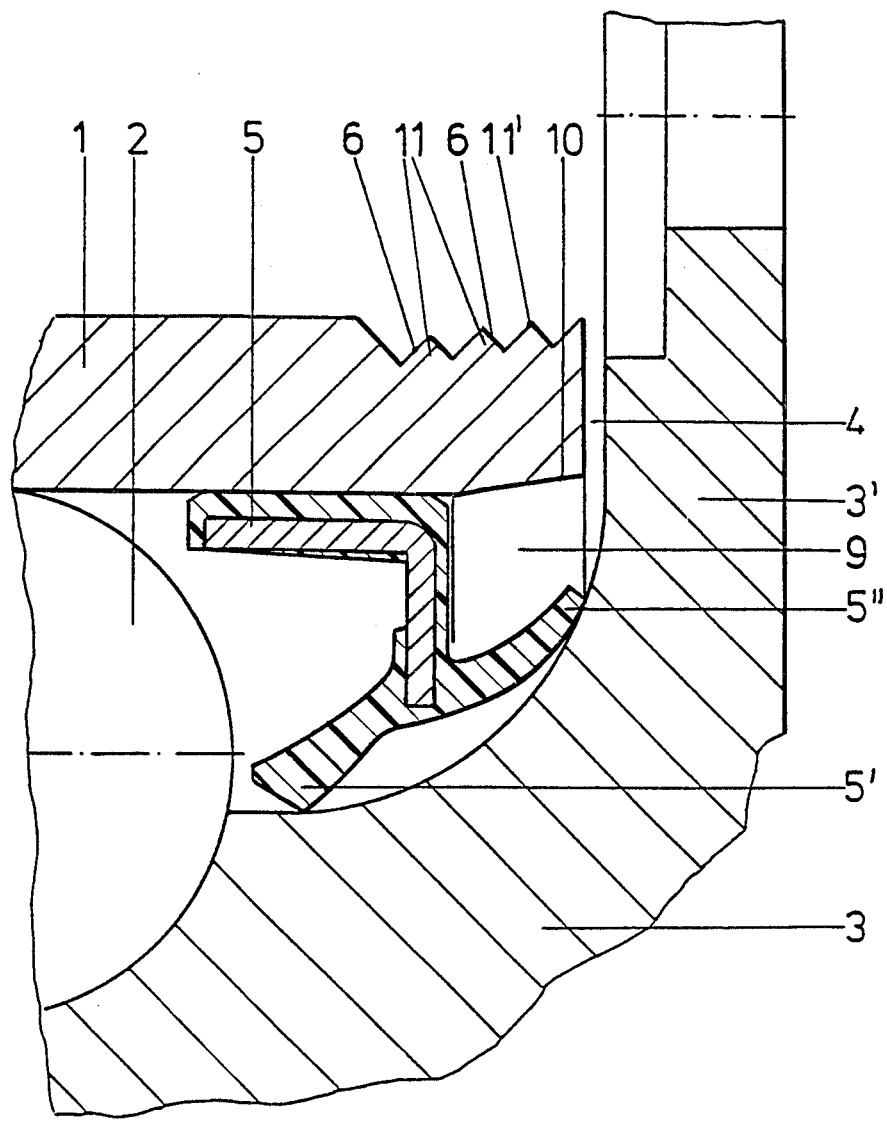
FIG. 2 is a partial cross section through a second embodiment of a wheel bearing system.

The embodiment of FIG. 2 has substantially the same construction as that of FIG. 1. In the lateral region of the external surface of the outer ring, a section with several oblique surfaces 6 is provided, instead of one oblique conical surface. This produces a section with teeth 11. This embodiment is particularly advantageous with the outer ring rotating since it removes dirty water particularly fast, because due to the centrifugal force, it is collected already in the upper region at each point 11' of a tooth 11 and is flung off from there.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A bearing comprising:
   an outer ring, an inner ring radially inward of the outer ring, a plurality of rolling elements between the outer and inner rings;
   the outer ring having an axially outer edge; the inner ring supporting a flange which extends radially outward from the inner ring and past the outward edge of the outer ring and defining a small axial length slot between the flange and the edge of the outer ring;
   the outer ring having a radially external surface, and toward the axial edge of the outer ring at the external surface, that surface includes a section that is radially inwardly inclined moving axially away from the axial edge for defining a conically shaped section of the external surface, whereby liquid on the external surface in the vicinity of the slot would tend to move axially away from the slot axially along the inwardly inclined section of the external surface;
   said flange extending radially outward of the outer ring, and there are attachment boreholes defined in the portion of the flange extending beyond the outer ring for attachment of the flange;
   said inclined section on the external surface of the outer ring beginning at the outer edge of the outer ring in the region of the attachment boreholes in the flange of the inner ring.

2. The bearing of claim 1, further comprising a seal disposed between the outer ring and the inner ring located axially inward on the outer ring from the outer edge.

3. The bearing of claim 1, wherein the radially inclined section of the external surface of the outer ring terminates in a circumferential groove around the outer ring that is axially inward from the outer edge of the outer ring.

4. The bearing of claim 3, wherein the outer ring has an internal surface which defines a borehole, and axially inward from the axially outer edge of the outer ring, that borehole is radially inwardly inclined in the axial direction away from the outer edge of the outer ring, whereby water which might enter the space between the outer and inner rings may be caused to settle along the outer ring surface in the borehole and exit through the slot.

5. The bearing of claim 1, wherein the outer ring has an internal surface which defines a borehole, and axially inward from the axially outer edge of the outer ring, that borehole is radially inwardly inclined in the axial direction away from the outer edge of the outer ring, whereby water which might enter the space between the outer and inner rings may be caused to settle along the outer ring surface in the borehole and exit through the slot.

6. The bearing of claim 5, wherein the radially inwardly inclined surface of the borehole is approximately parallel to the inclined, conical section of the exterior surface of the outer ring.

7. The bearing of claim 6, further comprising a seal disposed between the outer ring and the inner ring located axially inward on the outer ring from the outer edge, wherein the seal is axially inward of the conical borehole in the interior surface of the outer ring.

8. A bearing comprising:
an outer ring, an inner ring radially inward of the outer ring, a plurality of rolling elements between the outer and inner rings;
the outer ring having an axially outer edge; the inner ring supporting a flange which extends radially outward from the inner ring and past the outward edge of the outer ring and defining a small axial length slot between the flange and the edge of the outer ring;
the outer ring having a radially external surface, and toward the axial edge of the outer ring at the external surface, that surface includes a section that is radially inwardly inclined moving axially away from the axial edge for defining a conically shaped section of the external surface, whereby liquid on the external surface in the vicinity of the slot would tend to move axially away from the slot axially along the inwardly inclined section of the external surface;
a plurality of the inclined sections at the external surface of the outer ring, starting at the outer edge of the outer ring and moving axially inward;
each of said sections starting radially outward and being inclined radially inward moving axially inward from the outward edge, and each section starting radially more outward than the axially inward end of the previous inclined section, providing the external surface of the outer ring inward from the outer edge with a circumferential, generally toothed shape defined by the plurality of inclined sections.

9. The bearing of claim 8, wherein each of the two toothed sections starts from a radially more elevated peak and terminates axially inward at a radially more inward groove, and each successive peak and its respective groove of each section axially more inward from the outer edge of the outer ring is gradually radially more inward than the peak and respective groove of the axially previous section, so that the teeth also define a radially inwardly inclined array.

10. The bearing of claim 8, wherein the outer ring has an internal surface which defines a borehole, and axial inwardly from the axially outer edge of the outer ring, that borehole is radially inwardly inclined in the axial direction away from the outer edge of the outer ring, whereby water which might enter the space between the outer and inner rings may be caused to settle along the outer ring surface in the borehole and exit through the slot.

11. A bearing comprising:
an outer ring, an inner ring radially inward of the outer ring, a plurality of rolling elements between the outer and inner rings;
the outer ring having an axially outer edge; the inner ring supporting a flange which extends radially outward from the inner ring and past the outward edge of the outer ring and defining a small axial length slot between the flange and the edge of the outer ring;
the outer ring having a radially external surface, and toward the axial edge of the outer ring at the external surface, that external surface includes a section that is radially inwardly inclined moving axially away from the axial edge for defining a conically shaped section of the external surface, whereby liquid on the external surface in the vicinity of the slot would tend to move axially away from the slot axially along the inwardly inclined section of the external surface;
sealing means secured to one of said rings and being in sliding engagement with the other of said rings.

12. The bearing of claim 11 wherein there are a plurality of the inclined sections at the external surface of the outer ring, starting at the outer edge of the outer ring and moving axially inward;
each of said sections starting radially outward and being inclined radially inward moving axially inward from the outward edge, and each section starting radially more outward than the axially inward end of the previous inclined section, providing the external surface of the outer ring inward from the outer edge with a circumferential, generally toothed shape defined by the plurality of inclined sections.

13. The bearing of claim 11, wherein the sealing means is secured to the outer ring axially inward from the outer edge.

14. The bearing of claim 13, wherein the sealing means includes flexible first and second lips in sliding engagement with the inner ring and the flange, respectively.

15. The bearing of claim 14, wherein the outer ring has an internal surface and the sealing means is disposed radially inward of said internal surface.

16. The bearing of claim 15, wherein said first and second lips are in sliding engagement with said inner ring and said flange at locations disposed radially inward of said slot.

17. The bearing of claim 16, wherein each of said lips, cross-section, have a first and a second end;
said lips metting at said first ends, said second end of said first lip being engaged with said inner ring, and said second end of said second lip being engaged with said flange.

18. The bearing of claim 17, wherein said first lip flares axially inward from its said second end to its said first end, and said second lip flares axially outward from its said second end to its said first end.

19. The bearing of claim 11, wherein the outer ring has an internal surface which defines a borehole, and axially inward from the axially outer edge of the outer ring, that borehole is radially inwardly inclined in the axial direction away from the outer edge of the outer ring, whereby water which might enter the space between the outer and inner rings may be caused to settle along the outer ring surface in the borehole and exit through the slot.

* * * * *